Sept. 22, 1936.  L. SAIVES  2,054,951
BODY OF AUTOMOBILE VEHICLES
Filed Jan. 22, 1935
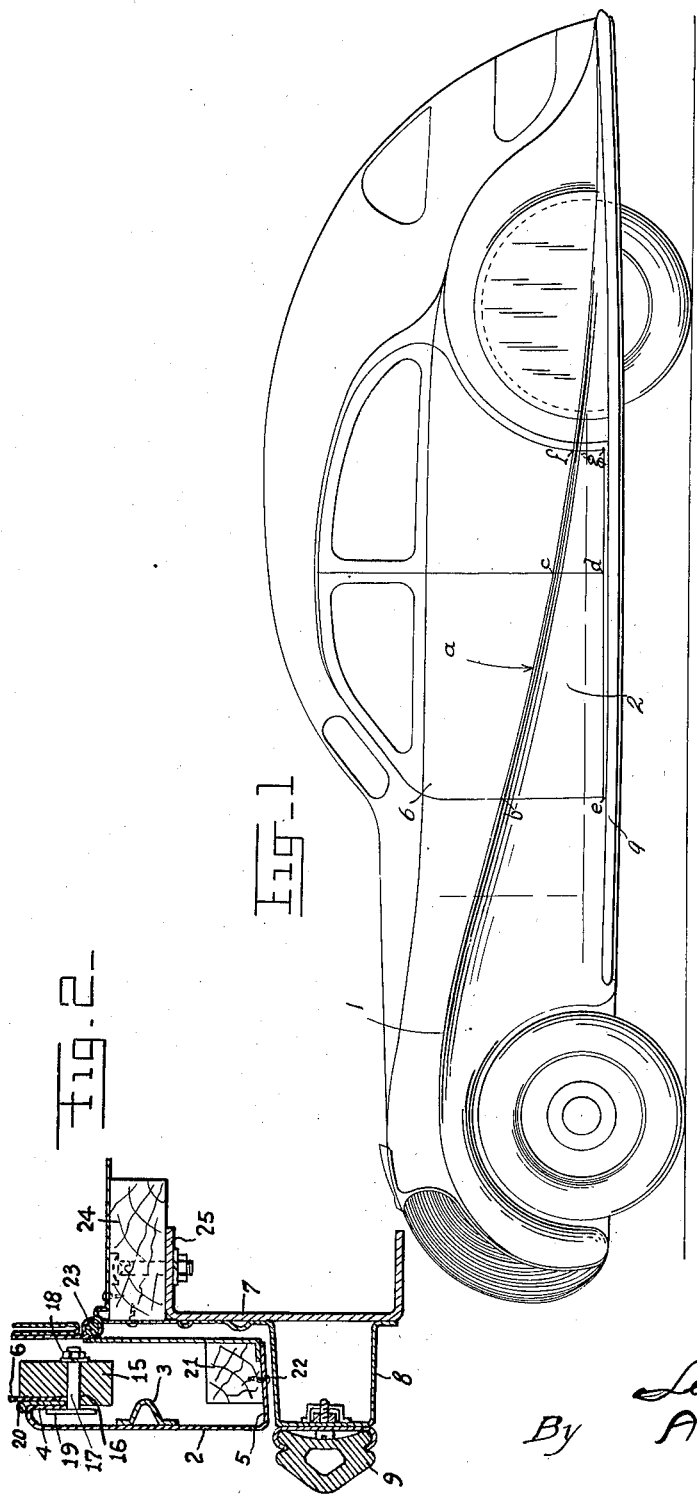
Inventor.
Leon Saives
By A. M. Bunn
Att'y.

Patented Sept. 22, 1936

2,054,951

UNITED STATES PATENT OFFICE 2,054,951

BODY OF AUTOMOBILE VEHICLES

Leon Saives, Billancourt, France, assignor to Louis Renault, Billancourt, France Application January 22, 1935, Serial No. 2,975
In France August 1, 1934

3 Claims. (Cl. 280—152)

The present invention relates to bodies of automobile vehicles and is more particularly applicable to bodies of the streamline type and has for its object to reduce the air resistance to movement by providing mudguards of appropriate outline.

According to the present invention, in or for the body of an automobile vehicle, the front mudguards are of stream line form, and when in position on the vehicle, run from the front to approximately the rear of the body.

In carrying out the invention the mudguards are constructed in sections which when assembled on the body have a profile of streamline form and of approximately the length of the body, and the sections overlapping the doors of the vehicle are adapted to be secured to and movable with the said doors. The invention has therefore more particularly for its object the arrangements and mounting of the sections of the mudguard which are mounted on the door and furthermore to the mounting and arrangement of the lateral fenders which run from one end of the vehicle to the other.

One practical embodiment of the invention is given by way of example in the accompanying drawing, in which.

Fig. 1 is a view of an automobile vehicle, the body of which shows the improvements which are the object of the present invention.

Fig. 2 is a vertical cross-section of the chassis frame, in the region of the front door, for example.

Referring to the drawing the front mudguard or fender 1 is prolonged to the back end of the body following the line a. The profile of the mudguard is suitably chosen in order to allow a rational flow of the streamlines and thereby to diminish the resistance to movement of the vehicle. In the case of a body having four doors such as that represented in the drawing the sections b, c, d, e and c, d, g, f overlapping the doors and which join the front part of the mudguard to the back part are constituted from sheet metal casings secured to the lower part of the doors. Referring to Fig. 2, each casing is constituted by a piece of sheet metal 2 reinforced by a rib 3 and formed with an upper vertical part 4 and a lower horizontal part 5, which parts are secured on the door 6. The means for securing the casing 2 to the door 6 comprises a horizontally extending beam 15 apertured as at 16 to receive a bolt 17 having a nut 18 at one end thereof and a plate 19 at its opposite end. The vertical portion 4 of the casing 2 is forced into contact and held in position by the bolt and nut structure 16 and 17, by drawing the plate 19 into contact with the beam 15 and a portion of door 6 (see Fig. 2). A welt strip 20 is interposed between said vertical portion 4 of the casing and a portion of the door 6 for a purpose which will be apparent. An additional beam 21 rests on the horizontal portion 5 of the casing 2 and is secured thereto by a screw 22, the beam being also fastened by any suitable means to a section of the door 6. The latter also carries a wind lace 23 which is in contact in the closed position of the door with the edge of the floor boards 24 carried by the chassis 25 of the vehicle. Beneath the doors, and secured on the frame side member 7 of the chassis 25 is the casing 8 formed from sheet metal and projecting outwards to approximately the same distance as the formed members 2. On the external face of the casing 8 is mounted the lateral guard member or rail 9 of an appropriate kind.

The casing 8 on either side of the vehicle serves as a footboard when the doors are opened and the body is protected against lateral collisions by the rails 9. The formed members 2 may be made of stock sizes so that if they become destroyed they may easily be renewed. It is understood that the rails 9 may be lengthened so as to form the rear bumpers, or the rails may be joined with these latter.

I claim:

1. A fender structure for a vehicle body provided with doors comprising a tapered fender member extending from the front to the rear of the vehicle and secured to said body laterally thereof, said fender member being formed in sections with one of said sections secured to the external surface of a door.

2. A fender structure for a vehicle body provided with doors comprising a tapered fender member extending from the front to the rear of the vehicle and secured to said body laterally thereof, said fender member being formed in sections with one of said sections secured to the lowermost portion of the external surface of one of said doors.

3. In a motor vehicle having a body provided with doors, a tapered fender member extending from the front to the rear of the vehicle and secured to the said body laterally thereof, said member being formed in sections with one of said sections secured to the lowermost portion of the external surface of one of said doors, and internal ribs carried by the door and said last mentioned section for reenforcing the latter.

LEON SAIVES.